US006702636B2

(12) United States Patent
Nakata et al.

(10) Patent No.: US 6,702,636 B2
(45) Date of Patent: Mar. 9, 2004

(54) METHOD AND APPARATUS FOR MANUFACTURING IMAGE DISPLAY DEVICE

(75) Inventors: Kohei Nakata, Tokyo (JP); Toshihiko Miyazaki, Kanagawa (JP); Tetsuya Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 09/961,430

(22) Filed: Sep. 25, 2001

(65) Prior Publication Data

US 2002/0038558 A1 Apr. 4, 2002

(30) Foreign Application Priority Data

Sep. 29, 2000 (JP) .......................................... 2000-298027

(51) Int. Cl.$^7$ ................................................. H01J 9/00

(52) U.S. Cl. ....................................................... 445/25

(58) Field of Search ............................ 445/24, 25, 40, 445/41, 59

(56) References Cited

U.S. PATENT DOCUMENTS

| | | | | |
|---|---|---|---|---|
| 5,813,893 A | * | 9/1998 | Robinson ....................... | 445/25 |
| 5,984,748 A | * | 11/1999 | Ritter et al. ................... | 445/24 |
| 6,254,449 B1 | | 7/2001 | Nakanishi et al. ............. | 445/25 |
| 6,552,488 B1 | * | 4/2003 | Roitman et al. ............... | 445/24 |
| 6,579,462 B2 | * | 6/2003 | Khan et al. .................... | 445/24 |
| 6,596,141 B2 | * | 7/2003 | Rasmussen ................... | 445/24 |
| 6,617,767 B2 | * | 9/2003 | Juen ............................. | 445/25 |

FOREIGN PATENT DOCUMENTS

JP 11-135018 5/1999

OTHER PUBLICATIONS

W.P. Dyke, et al., "Field Emission", Advances in Electronics and Electron Physics, vol. VIII, pp. 89–185 (1956).
C.A. Spindt, et al., "Physical Properties of Thin–Film Emission Cathodes with Molybdenum Cones", Journal of Applied Physics, vol. 47, No. 12, pp. 5248–5263 (Dec. 1976).
C.A. Mead, "Operation of Tunnel–Emission Devices", Journal of Applied Physics, vol. 32, No. 4, pp. 646–652 (Apr. 1961).
M.I. Elinson, et al., "the Emission of Hot Electrons and the Field Emission of Electrons from Tin Oxide", Radio Engineering and Electronic Physics, No. 7, pp. 1290–1296 (Jul. 1965).
G. Dittmer, "Electrical Conduction and Electron Emission of Discontinuous Thin Films", Thin Solid Films, vol. 9, pp. 317–329 (1972).
M. Hartwell, et al., "Strong Electron Emission from Patterned Tin–Indium Oxide Films", International Electron Devices Meeting, pp. 519–521 (1975).
H. Araki, et al., "Electroforming and Electron Emission of Carbon Thin Films", pp. 22–29 (Jan. 26, 1983). Only "Abstract" translated.

* cited by examiner

*Primary Examiner*—Dean A. Reichard
*Assistant Examiner*—Adolfo Nino
(74) *Attorney, Agent, or Firm*—Fitzpatrick, Cella, Harper & Scinto

(57) ABSTRACT

The present invention provides a method of manufacturing an image display device in which a panel member constituting a panel of an image display device is transferred to a plurality of processing chambers each having a temperature control unit, and subjected to a plurality of processing steps under temperature control. The temperature of the panel member in each of the processing chambers is set to be not more than the set temperature of the panel member in the previous processing chamber by the temperature control unit.

48 Claims, 2 Drawing Sheets

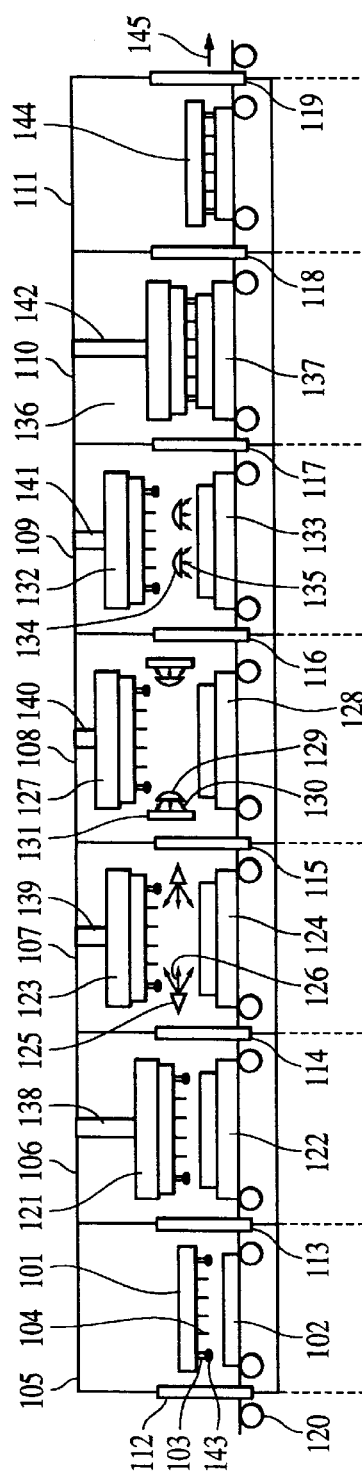
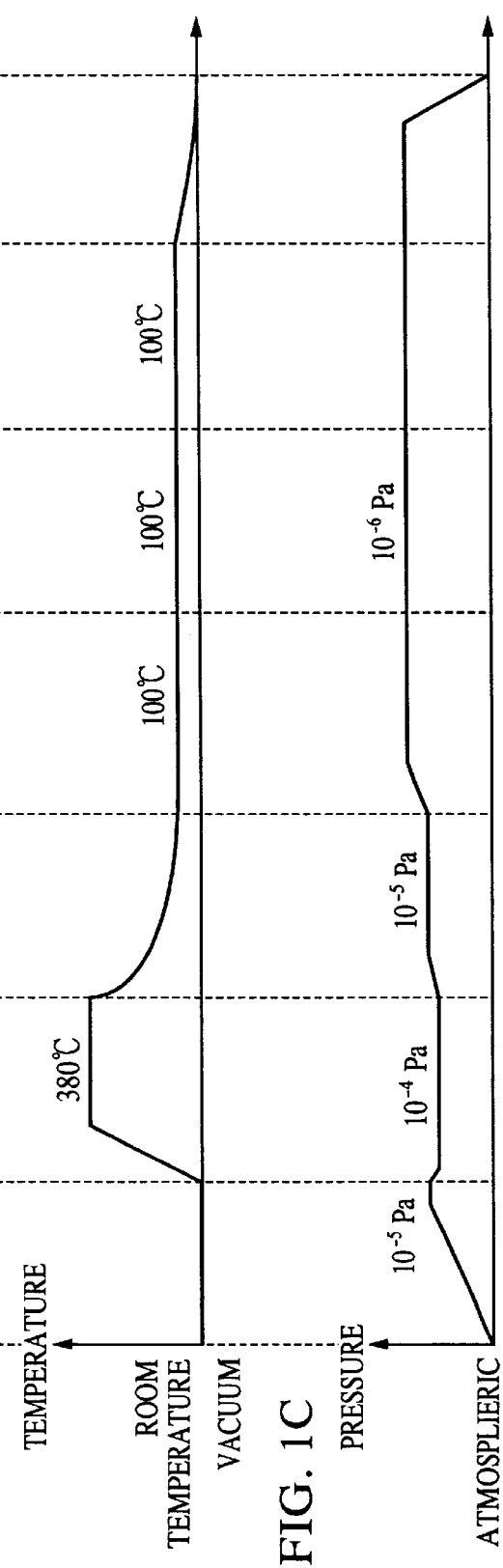
FIG. 1A
FIG. 1B
FIG. 1C

METHOD AND APPARATUS FOR MANUFACTURING IMAGE DISPLAY DEVICE

BACKGROUND OF THE INVENTION

1. Field of the Invention

The present invention relates to a method and apparatus for manufacturing an image display device, particularly, an image display device comprising a display panel formed by sealing a faceplate constituting the display surface of the display panel, and a rear plate arranged opposite to the faceplate with a space therebetween and constituting the back of the display panel.

2. Description of the Related Art

Conventional known electron emitting devices are roughly divided into two types including a thermoelectron emitting device and a cold-cathode electron emitting device. The cold-cathode electron emitting device includes field emission type (referred to as a "FE type" hereinafter), a metal/insulating layer/metal type (referred to as a "MIM type" hereinafter), and surface conduction type electron emitting devices.

Known examples of the FE type are disclosed in W. P. Dyke & W. W. Dolan, "Field Emission", Advance in Electron Physics, 8, 89 (1956), C. A. Spindt, "PHYSICAL Properties of thin-film field emission cathodes with molybdenum cones", J. Appl., 47, 5248 (1976), etc.

Known examples of the MIM type are disclosed in C. A. Mead, "Operation of Tunnel-Emission Devices", J. Appl. Phys., 32, 646 (1961), etc.

Examples of the surface conduction type electron emitting device are disclosed in M. I. Elinson, Radio Eng. Electron Phys., 10, 1290 (1965), etc.

The surface conduction type electron emitting device utilizes the phenomenon that an electric current is passed through a small-area thin film formed on a substrate in parallel with the film plane to emit electrons. As the surface conduction type electron emitting device, a device using a $SnO_2$ thin film disclosed by Elinson, a device using an Au thin film [G. Dittmer, "Thin Solid Films", 9, 317 (1972), a device using a $In_2O_3/SnO_2$ thin film [M. Hartwell and C. G. Fonstad, "IEEE Thrns. ED Cong.", 519 (1975), a device using a carbon thin film [Hisashi Araki, et al., Vacuum, Vol. 26, No. 1, p. 22 (1983)], etc.

In manufacturing an image display device using the above-described electron emitting device, an electron source substrate (rear plate) comprising the electron emitting devices arranged in a matrix thereon, and a fluorescent plate (faceplate) comprising a fluorescent material which emits light by excitation of an electron beam are prepared. The faceplate and the rear plate are arranged opposite to each other so that the electron emitting devices and the fluorescent material are located on the inside, with a package for providing a vacuum sealed structure and a spacer for providing an atmospheric pressure resistant structure being arranged therebetween. Then, the inside is sealed with a low-melting-point material used as a sealing material, such as frit glass or the like, and evaluated through a log vacuum exhaust tube previously provided, and then the vacuum exhaust tube is sealed to form a display panel.

The above-described conventional manufacturing method requires a long time for manufacturing a display panel, and is not suitable for manufacturing a display panel in which, for example, the internal pressure is $10^{-6}$ Pa or less.

The problems of the conventional method are resolved by the method disclosed in, for example, Japanese Patent Laid-Open No. 11-135018.

The method disclosed in Japanese Patent Laid-Open No. 11-135018 comprises only the steps of aligning the faceplate and the rear plate in a single vacuum chamber, and then sealing the two substrates. Therefore, each of the other steps required for forming the display panel, i.e., the baking step, the gettering step, the electron beam cleaning step, etc., must be performed in a single vacuum chamber. Therefore, the time required for the manufacturing process is increased, thereby causing demand for significantly shortening the time of the manufacturing process.

SUMMARY OF THE INVENTION

The present invention has been achieved in consideration of the above problems of the conventional process, and an object of the present invention is to shorten the time of each step for manufacturing an image display device to improve manufacturing efficiency.

In accordance with an aspect of the present invention, there is provided a method of manufacturing an image display device comprising successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, and a sealing chamber for sealing the panel member transferred thereto after baking, and the processing in each of the plurality of processing chambers is performed so that the temperature of the panel member in each of the processing chambers is set to a temperature of not more than that of the panel member in the previous chamber in the transfer process.

In accordance with another aspect of the present invention, there is provided an apparatus for manufacturing an image display device comprising a plurality of processing chambers each comprising temperature control means, to which a panel member, which constitutes a panel of an image display device, is transferred for performing a plurality of processings of the panel member under temperature control to manufacture an image display device, wherein the temperature control means of each of the processing chambers sets the temperature of the panel member to a temperature of not more than that of the panel member in the previous chamber in the transfer process.

Further objects, features and advantages of the present invention will become apparent from the following description of the preferred embodiments with reference to the attached drawings.

BRIEF DESCRIPTION OF THE DRAWINGS

FIG. 1 is a drawing schematically showing a manufacturing apparatus together with the temperature profile of a panel member and the pressure profile of each chamber in a manufacturing apparatus in accordance with the present invention.

DESCRIPTION OF THE PREFERRED EMBODIMENTS

Figure 2:
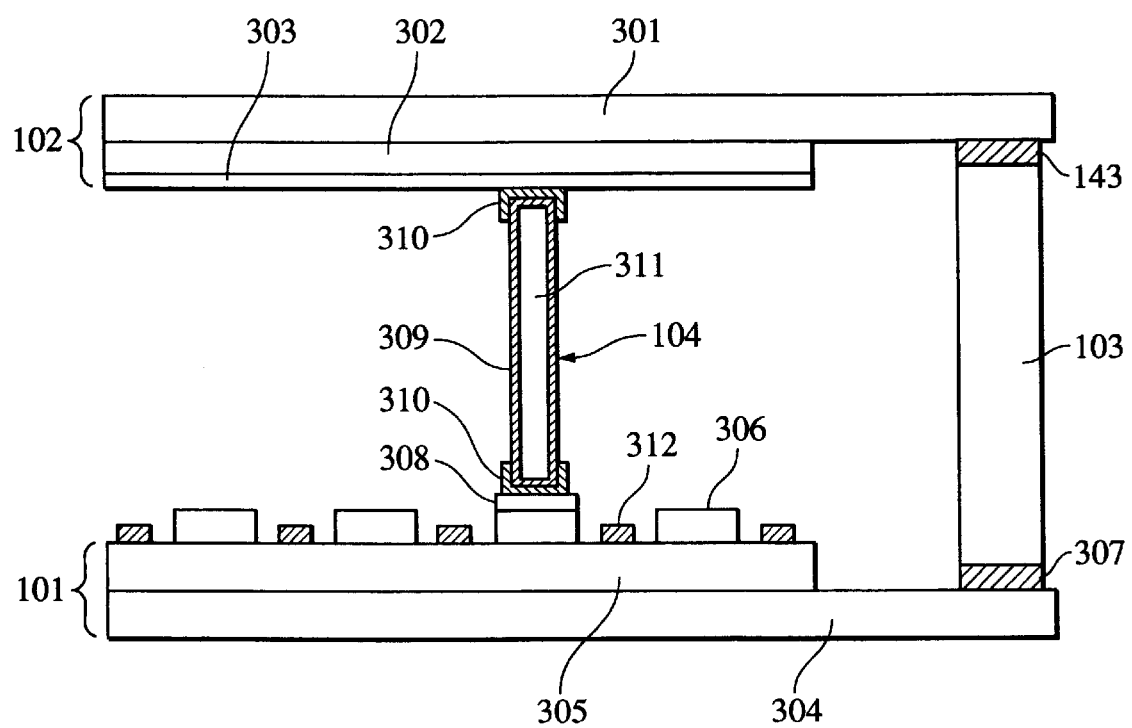
FIG. 2 is a sectional view showing a portion of an image display device formed by using a manufacturing apparatus and a manufacturing method of the present: invention.

A method of manufacturing an image display device of a first embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, and a sealing chamber for sealing the panel member transferred thereto after baking. The processing in each of the plurality of processing chambers is performed so that the temperature of the panel member in each of the processing chambers is set to a temperature of not more than that of the panel member in the previous chamber in the transfer process.

A method of manufacturing an image display device of a second embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a gettering chamber for gettering the panel member transferred thereto after baking, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the second embodiment of the present invention, preferably, the inside of the gettering chamber is further gettered, or the plurality of the processing chambers further include a front chamber adjacent to the gettering chamber, to which the panel member is transferred before transfer to the gettering chamber after baking in the baking chamber, the insides of the front chamber and the gettering chamber being set to $10^{-4}$ Pa or less.

A method of manufacturing an image display device of a third embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a surface cleaning chamber for cleaning the surface of the panel member transferred thereto after baking, a gettering chamber for gettering the panel member transferred thereto after surface cleaning, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the third embodiment of the present invention, preferably, the inside of the gettering chamber is further gettered, or the plurality of the processing chambers further include a front chamber adjacent to the gettering chamber, to which the panel member is transferred before transfer to the gettering chamber after baking in the baking chamber, the insides of the front chamber and the gettering chamber being set to $10^{-4}$ Pa or less.

Alternatively, the plurality of the processing chambers preferably further include a front chamber adjacent to the gettering chamber, to which the panel member is transferred before transfer to the gettering chamber after surface cleaning in the surface cleaning chamber, the insides of the front chamber and the gettering chamber being set to $10^{-4}$ Pa or less.

Alternatively, the surface cleaning chamber is preferably adjacent to the gettering chamber, the insides of the surface cleaning chamber and the gettering chamber being set to $10^{-4}$ Pa or less.

A method of manufacturing an image display device of a fourth embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a surface cleaning chamber for cleaning the surface of the panel member transferred thereto after baking, a pre-gettering chamber for gettering the inside of the processing chamber to which the panel member is transferred after surface cleaning, a gettering chamber for gettering the panel member transferred thereto after pre-gettering, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the fourth embodiment of the present invention, preferably, the plurality of the processing chambers preferably include a front chamber adjacent to the pre-gettering chamber, to which the panel member is transferred before transfer to the pre-gettering chamber after surface cleaning in the surface cleaning chamber, the insides of the front chamber, the pre-gettering chamber and the gettering chamber being set to $10^{-4}$ Pa or less.

Alternatively, the surface cleaning chamber is preferably adjacent to the pre-gettering chamber, the insides of the surface cleaning chamber, the pre-gettering chamber and the gettering chamber being set to $10^{-4}$ Pa or less.

In the third and fourth embodiments of the present invention, surface cleaning for cleaning the surface of the panel member is preferably performed by irradiating the surface with an electron beam, ions, an ultraviolet ray, or plasma.

A method of manufacturing an image display device of a fifth embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a pre-gettering chamber for gettering the inside of the processing chamber to which the panel member is transferred after baking, a gettering chamber for gettering the panel member transferred thereto after pre-gettering, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the fifth embodiment of the present invention, preferably, the plurality of the processing chambers preferably include a front chamber adjacent to the pre-gettering chamber, to which the panel member is transferred before transfer to the pre-gettering chamber after baking in the baking chamber, the insides of the front chamber, the pre-gettering chamber and the gettering chamber being set to $10^{-4}$ Pa or less.

In the first to fifth embodiments of the present invention, preferably, the sealing temperature of the panel member in the sealing chamber is set to be not more than the baking temperature of the panel member in the baking chamber, or the gettering temperature of the panel member in the gettering chamber is set to be not more than the baking temperature of the panel member in the baking chamber.

A method of manufacturing an image display device of a sixth embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, and a sealing chamber for sealing the panel member transferred thereto after cooling. The processing in each of the plurality of processing chambers is performed so that the temperature of the panel member in each of the processing chambers is set to a temperature of not more than that of the panel member in the previous chamber in the transfer process.

A method of manufacturing an image display device of a seventh embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a gettering chamber for gettering the panel member transferred thereto after cooling, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the seventh embodiment of the present invention, preferably the inside of the gettering chamber is further gettered, or the plurality of the processing chambers include a front chamber adjacent to the gettering chamber, to which the panel member is transferred before transfer to the gettering chamber after cooling in the cooling chamber, the insides of the front chamber and the gettering chamber being set to $10^{-4}$ Pa or less.

Alternatively, the cooling chamber is preferably adjacent to the gettering chamber, the insides of the cooling chamber and the gettering chamber being set to $10^{-4}$ Pa or less, the inside of the cooling chamber is preferably gettered, or surface cleaning of the panel member is preferably performed in the cooling chamber.

A method of manufacturing an image display device of an eighth embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a surface cleaning chamber for cleaning the surface of the panel member transferred thereto after cooling, a gettering chamber for gettering the panel member transferred thereto after surface cleaning, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the eighth embodiment of the present invention, the plurality of the processing chambers preferably include a front chamber adjacent to the gettering chamber, to which the panel member is transferred before transfer to the gettering chamber after surface cleaning in the surface cleaning chamber, the insides of the front chamber and the gettering chamber being set to $10^{-4}$ Pa or less.

Alternatively, the surface cleaning chamber is preferably adjacent to the gettering chamber, the insides of the surface cleaning chamber and the gettering chamber being set to $10^{-4}$ Pa or less, the inside of the gettering chamber is preferably further gettered.

A method of manufacturing an image display device of a ninth embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a surface cleaning chamber for cleaning the surface of the panel member transferred thereto after cooling, a pre-gettering chamber for pre-gettering the chamber to which the panel transfer is transferred after surface cleaning, a gettering chamber for gettering the panel member transferred thereto after pre-gettering, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the ninth embodiment of the present invention, the plurality of the processing chambers preferably include a front chamber adjacent to the pre-gettering chamber, to which the panel member is transferred before transfer to the pre-gettering chamber after surface cleaning in the surface cleaning chamber, the insides of the front chamber, the pre-gettering chamber, and the gettering chamber being set to $10^{-4}$ Pa or less.

Alternatively, the surface cleaning chamber is preferably adjacent to the pre-gettering chamber, the insides of the surface cleaning chamber, the pre-gettering chamber and the gettering chamber being set to $10^{-4}$ Pa or less.

In the eighth and ninth embodiments of the present invention, surface cleaning for cleaning the surface of the panel member is performed by irradiating the surface with an electron beam, ions, an ultraviolet ray, or plasma.

A method of manufacturing an image display device of a tenth embodiment of the present invention comprises successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a pre-gettering chamber for pre-gettering the processing chamber to which the panel transfer is transferred after cooling, a gettering chamber for member transferred thereto after pre-gettering, and a sealing chamber for sealing the panel member transferred thereto after gettering. The processing in each of the plurality of processing chambers is performed so that the temperature of the panel member in each of the processing chambers is set to a temperature of not more than that of the panel member in the previous chamber in the transfer process.

In the tenth embodiment of the present invention, the plurality of the processing chambers preferably include a front chamber adjacent to the pre-gettering chamber, to which the panel member is transferred before transfer to the pre-gettering chamber after cooling in the cooling chamber, the insides of the front chamber, the pre-gettering chamber, and the gettering chamber being set to $10^{-4}$ Pa or less.

Alternatively, the cooling chamber is preferably adjacent to the pre-gettering chamber, the insides of the cooling chamber, the pre-gettering chamber and the gettering chamber being set to $10^{-4}$ Pa or less.

In the first to tenth embodiments of the present invention, a sealing material used for sealing the panel member has a melting point lower than the temperature of the panel member in the processing chamber before the sealing chamber, or the sealing material comprises any one of a gallium-indium alloy, a gallium-tin alloy, and an aluminum-gallium alloy.

In the first to tenth embodiments of the present invention, the panel member preferably comprises a faceplate which constitutes the display surface of the panel, and is sealed together with a rear plate which is arranged opposite to the faceplate with a space therebetween to form the back of the panel.

Alternatively, the rear plate preferably comprises a first sealing material provided thereon for sealing the panel member, or an outer frame constituting the sides of the panel and fixed with a second sealing material, and a first sealing material arranged on the outer frame, for sealing the panel member.

Alternatively the second sealing material preferably has a higher melting point than the first sealing material, the first sealing material preferably comprises a low-melting-point metal or an alloy thereof, or the second sealing material preferably comprises frit glass.

In the first to tenth embodiments of the present invention, the panel member preferably further comprises the first sealing material provided on the faceplate so that the panel member and the rear plate are sealed with the first sealing material.

Alternatively, the rear plate preferably comprises the outer frame fixed thereto with the second sealing material to form the sides of the panel fixed, the second sealing material preferably has a higher melting point than the first sealing material, or the first sealing material preferably comprises a low-melting-point metal or an alloy thereof.

In the first to tenth embodiments of the present invention, the panel member preferably further comprises the outer frame fixed to the faceplate with the second sealing material and constituting the sides of the panel so that the panel member and the rear plate are sealed together.

Alternatively, the rear plate preferably comprises the first sealing material provided thereon for sealing the panel member, the second sealing material preferably has a higher melting point than the first sealing material, the first sealing material preferably comprises a low-melting-point metal or an alloy thereof, or the second sealing material preferably comprises frit glass.

In the first to tenth embodiments of the present invention, the panel member preferably further comprises the outer frame fixed to the faceplate with the second sealing material and constituting the sides of the panel, and the first sealing material arranged on the outer frame so that the panel member and the rear plate are sealed with the first sealing material.

Alternatively, the second sealing material preferably has a higher melting point than the first sealing material, the first sealing material preferably comprises a low-melting point or an alloy thereof, or the second sealing material preferably comprises frit glass.

In the first to tenth embodiments of the present invention, the panel member preferably comprises the rear plate arranged opposite to the faceplate constituting the display surface of the panel with a space therebetween to form the back of the panel, and is sealed together with the faceplate.

Alternatively, the faceplate preferably comprises the first sealing material provided thereon for sealing the panel member, or the outer frame constituting the sides of the panel fixed with the second sealing material and the first sealing material arranged on the outer frame, for sealing the panel member.

Alternatively, the second sealing material preferably has a higher melting point than the first sealing material, the first sealing material preferably comprises a low-melting-point metal or an alloy thereof, or the second sealing material preferably comprises frit glass.

In the first to tenth embodiments of the present invention, the panel member preferably further comprises the first sealing material arranged on the rear plate so that the panel member and the faceplate are sealed with the first sealing material.

Alternatively, the faceplate preferably comprises the outer frame fixed thereto with the second sealing material and constituting the sides of the panel.

Alternatively, the second sealing material preferably has a higher melting point than the first sealing material, the first sealing material preferably comprises a low-melting-point metal or an alloy thereof, or the second sealing material preferably comprises frit glass.

In the first to tenth embodiments of the present invention, the panel member preferably further comprises the outer frame fixed to the rear plate with the second sealing material and constituting the sides of the panel.

Alternatively, the faceplate preferably comprises the first sealing material for sealing the panel member.

Alternatively, the second sealing material preferably has a higher melting point than the first: sealing material, the first sealing material preferably comprises a low-melting-point metal or an alloy thereof, or the second sealing material preferably comprises frit glass.

In the first to tenth embodiments of the present invention, the panel member preferably further comprises the outer frame fixed to the rear plate with the second sealing material and constituting the sides of the panel, and the first sealing material arranged on the outer frame so that the panel member and the faceplate are sealed with the first sealing material.

Alternatively, the second sealing material preferably has a higher melting point than the first sealing material, the first sealing material preferably comprises a low-melting-point metal or an alloy thereof, or the second sealing material preferably comprises frit glass.

In the first to tenth embodiments of the present invention, the faceplate preferably comprises a fluorescent material, or a fluorescent material and a metal back, the rear plate preferably comprises fluorescent material exciting means, or the fluorescent material exciting means preferably comprises an electron emitting device.

An apparatus for manufacturing an image display device according to an eleventh embodiment of the present invention comprises a plurality of processing chambers each comprising temperature control means, to which a panel member constituting a panel of an image display device is transferred for performing a plurality of processings of the panel member under temperature control to manufacture an image display device.

The temperature control means in each of the plurality of processing chambers sets the temperature of the panel member in each of the processing chambers to a temperature of not more than that of the panel member in the previous chamber in the transfer process.

In the eleventh embodiment of the present invention, the plurality of the processing chambers preferably include a baking chamber for baking the panel member, and a sealing chamber for sealing the panel member transferred thereto after baking in the baking camber, or a gettering chamber for forming a getter film on the panel member, and a sealing chamber for sealing the panel member after gettering in the gettering chamber.

Alternatively, the plurality of the processing chambers preferably include a surface cleaning chamber for cleaning the surface of the panel member, a gettering chamber for forming a getter film on the panel member transferred thereto after surface cleaning in the surface cleaning chamber, and a sealing chamber for sealing the panel member transferred thereto after gettering in the gettering chamber, or a surface cleaning chamber for cleaning the surface of the panel member, a pre-gettering chamber for pre-gettering the panel member transferred thereto after surface cleaning in the surface cleaning chamber, a gettering chamber for forming a getter film on the panel member transferred thereto after pre-gettering in the pre-gettering chamber, and a sealing chamber for sealing the panel member transferred thereto after gettering in the gettering chamber.

Alternatively, the plurality of the processing chambers preferably include a baking chamber provided before each of the processing chambers, for baking the panel member transferred thereto.

Alternatively, the sealing material used in the sealing chamber preferably comprises any one of a gallium-indium alloy, a gallium-tin alloy, and an aluminum-gallium alloy, or heat shield members are preferably provided between the respective processing chambers, the heat shield member comprising a reflecting metal.

Alternatively, the panel member which forms the panel of the image display device preferably comprises the two component members including a first panel member including a substrate comprising fluorescent material exciting means, and a second panel member including a substrate comprising a fluorescent material arranged thereon.

The first panel member preferably comprises the substrate on which the fluorescent material exciting means is arranged, and an outer frame, the substrate on which the fluorescent material exciting means is arranged, and a spacer, or the substrate on which the fluorescent material exciting means is arranged, the outer frame, and the spacer.

The second panel member preferably comprises the substrate on which the fluorescent material is arranged, and an outer frame, the substrate on which the fluorescent material is arranged, and a spacer, or the substrate on which the fluorescent material is arranged, the outer frame, and the spacer.

The fluorescent material exciting means preferably comprises an electron beam emitting device.

In each of the above-described methods and apparatus for manufacturing an image display device of the present invention, in which a plurality of different processing steps are continuously performed, the temperature of the panel member in each of the processing chambers is set to a temperature of not more than that of the panel member in the previous chamber in the transfer process. Therefore, the time required for controlling the temperature, particularly the time required for increasing the temperature, can be shortened to shorten the manufacturing process time.

The present invention can solve the problem in which gases are released again from the panel member due to an excessive re-increase in temperature, particularly, a re-increase in temperature during sealing, to deteriorate the degree of vacuum in the atmosphere.

In the present invention, the gettering temperature of the panel member is set to a temperature of not more than the baking temperature of the panel member, and thus thermal deterioration of the getter film formed on the panel member can be significantly decreased.

In the present invention, the inside of the front chamber or the previous processing chamber adjacent to the gettering chamber is set to a reduced pressure of $10^{-4}$ Pa or less, more preferably $10^{-5}$ Pa or less. Therefore, the degree of vacuum in the gettering chamber can be prevented from being excessively decreased when the panel member is transferred to the gettering chamber, thereby shortening the standby time required from transfer of the member to the gettering chamber to gettering.

In the present invention, the heating temperature in the sealing step is not more than the gettering temperature of the panel member, to significantly decrease thermal deterioration of the getter film formed on the panel member.

In the present invention, the surface of the first or second member is cleaned in the cooling chamber so that after heat in the previous step such as the baking step or the like can be utilized for cleaning the surface of the member, thereby permitting efficient surface cleaning.

In the present invention, cooling or the cooling chamber prevents breakage of the panel member due to an excessive decrease in temperature, and when cooling or the cooling chamber is provided between the baking step and the gettering step, thermal deterioration of the getter film formed on the member can be significantly decreased.

In the present invention, the heat shield member is provided between the baking chamber and the gettering chamber, and thus thermal deterioration of the getter film formed on the member can be significantly decreased.

In the present invention, the heat shield members are provided between the respective processing chambers, and thus heat transfer between the respective processing chambers can be minimized to significantly shorten the time required for controlling the temperature of each of the processing chambers, thereby significantly shortening the manufacturing process time.

In the present invention, the outer frame is fixed to the faceplate or the rear plate with the second sealing material having a high melting point, and thus the plates and the outer frame can be prevented from deviating from the predetermined positions due to softening of the second sealing material at the sealing temperature of the first sealing material in the sealing chamber.

EMBODIMENT

FIG. 1A is a drawing schematically showing a manufacturing apparatus in accordance with an embodiment of the present invention, FIG. 1B is the temperature profile of an image display device, i.e., the temperature profile showing the temperature of a member which forms a panel of the image display device, and FIG. 1C is the pressure profile showing the pressure in the manufacturing apparatus. A manufacturing method and apparatus of the present: invention are described based on these drawings. Particularly, an electron beam image display apparatus is described below, in which an electron source comprising a plurality of electron emitting devices arranged in a matrix, and a fluorescent material which emits light by irradiation with electrons from the electron source are provided in a panel.

In FIG. 1A, reference numeral 101 denotes a rear plate (referred to as "RP" hereinafter) serving as a panel member, on which a plurality of electron emitting devices serving as fluorescent material exciting means are arranged in a matrix to form an electron source. Reference numeral 102 denotes a faceplate (referred to as "FP" hereinafter) serving as a panel member, on which a fluorescent material, a metal back, etc. are formed. Reference numeral 103 denotes an outer frame serving as a panel member, which is disposed between the RP 101 and the FP 102 to form a panel comprising an airtight container together with the RP 101 and the FP 102. Reference numeral 104 denotes a spacer for maintaining the gap between the RP 101 and the FP 102. In this embodiment, the outer frame 103 and the spacer 104 are previously fixed to the RP 101.

Reference numeral 105 denotes a front chamber; reference numeral 106, a baking chamber; reference numeral 107, a surface cleaning chamber; reference numeral 108, a pre-gettering chamber (chamber gettering chamber); reference numeral 109, a gettering chamber (panel gettering chamber); reference numeral 110, a sealing chamber; reference numeral 111, a cooling chamber. These chambers are arranged and connected in the transfer direction (the direction shown by an arrow 145 in the drawing), and each of the chambers is evacuated by a vacuum pump (not shown) to form a vacuum atmosphere.

In the surface cleaning chamber 107, the surface of the member such as the outer frame, the spacer or the like is cleaned by irradiation with electron beams, ions, or plasma. In this embodiment, the surface cleaning chamber 107 is an electron beam irradiation chamber (referred to as a EB irradiation chamber" hereinafter) comprising electron beam irradiation means.

The pre-gettering chamber (chamber gettering chamber) 108 is a processing chamber in which a getter film is formed on a member other than the panel component members arranged therein. The pre-gettering chamber 108 is provided for preventing a decrease in the degree of vacuum in the next gettering chamber 109 when the panel member is transferred to the gettering chamber 109. The gettering chamber (panel gettering chamber) 109 is a processing chamber in which a getter film is formed on the panel component member itself in order to maintain the degree of vacuum in the panel container after sealing of the panel member.

The processing chambers are separated from the atmosphere by gate valves 112 and 119, and separated from each other by gate valves 113, 114, 115, 116, 117 and 118. The RP 101, the RP 102, the outer frame 103 and the spacer 104 are first transferred as the panel member to the front chamber 105 by opening and closing the gate valve 112, and then moved to the processing chambers in order by opening and closing the gate valves. Reference numeral 102 denotes a transfer roller for moving the panel member to each of the processing chambers.

Reference numerals 121, 123, 127, 132 and 136 each denote a hot plate for controlling the temperature of the RP 101 and the outer frame 102 and the spacer 104 which are fixed to the RP 101. Reference numerals 122, 124, 128, 133 and 137 each denote a hot plate for controlling the temperature of the FP 102

Reference numeral 125 denotes an electron gun for EB irradiation in the EB irradiation chamber 107, and reference numeral 126 denotes an electron beam emitted from the electron gun 125.

In the chamber gettering chamber 108, reference numeral 129 denotes a chamber getter flash device, and reference numeral 130 denotes a chamber getter flash produced by the chamber getter flash device 129 in which a material such as Ba or the like is evaporated instantaneously. Reference numeral 131 denotes a chamber getter plate to which the chamber getter flash 130 is adhered to perform an exhaust function as a chamber getter. Namely, the degree of vacuum in the chamber gettering chamber 108 can be increased.

In the panel gettering chamber 109, reference numeral 134 denotes a panel getter flash device, and reference numeral 135 denotes a panel getter flash produced by the panel getter flash device 134. The panel getter flash 135 is produced by evaporating instantaneously a material such as Ba or the like and adhered to the FP 102.

Reference numerals 138, 139, 140, 141 and 142 denote elevating machines which support the hot plates 121, 123, 127, 132 and 136, respectively, and which have the functions to elevate the hot plates to heights necessary for the respective processing steps.

In FIG. 1B, the step in each of the processing chambers of the manufacturing apparatus shown in FIG. 1A is shown on the abscissa, and the temperature of the panel member in the step of each of the processing chambers is shown on the ordinate. This temperature profile shows the temperature conditions of the RP 101 and the FP 102. In FIG. 1C, the step in each of the processing chambers of the manufacturing apparatus is shown on the abscissa, and the pressure in each of the processing chambers is shown on the ordinate.

The RP 101, the FP 102, the outer frame 103, and the spacer 104 are passed through the processing chambers in order by drive of the transfer rollers 120 serving as transfer means in the direction shown by an arrow 145 to be processed during passage.

In this embodiment, a first member comprising the RP 101 on which the electron source is arranged, the outer frame 103, and the spacer 104, and a second member comprising the FP 102 on which a fluorescent material and a metal back are arranged are first prepared in the front chamber 105 in a vacuum atmosphere. Then, baking in the baking chamber 106, electron beam irradiation in the EB irradiation chamber 107, chamber gettering for obtaining a high vacuum in the chamber gettering chamber 108, panel gettering for producing a getter flash toward the panel in the panel gettering chamber 109, heat sealing in the sealing chamber 110 and cooling in the cooling chamber 111 are carried out on the line of the processing steps. A plurality of members for forming the panel of the image display device are successively carried in the line, transferred, and carried out of the line to manufacture the image display device.

In the manufacturing apparatus shown in FIG. 1A, as described above, the gate valves 112, 113, 114, 115, 116, 117, 118 and 119 are disposed between the atmosphere and the apparatus and between the respective processing chambers so that each of the processing chambers is evacuated by a vacuum pumping system not shown in the drawing. Although, in this embodiment, the gate valves 112, 113, 114, 115, 116, 117, 118 and 119 are disposed between the atmosphere and the apparatus and between the respective processing chambers, the gate valves may be disposed only between the processing chambers having different pressures in the pressure profile shown in FIG. 1C, and between the atmosphere and the apparatus. For example, the gate valves 116 and 117 between the chamber gettering chamber 108 and the panel gettering chamber 109, and between the panel gettering chamber 109 and the sealing chamber 110 can be omitted.

As described above, when no gate valve is provided between the adjacent processing chambers, and when the panel temperatures in the respective processing steps are different, a heat shield member (the shape of a plate, a film, or the like) made of a reflecting metal such as aluminum, chromium, stainless steel, or the like is preferably disposed between the processing steps. The heat shield member is preferably disposed at any desired position between the processing chambers having different panel member temperatures in the temperature profile shown in FIG. 1B, for example, between the baking chamber 106 and the panel gettering chamber 109. Alternatively, the heat shield member may be disposed between the respective processing chambers. The heat shield member is provided so as not to interfere with the movement of the FP 102 and RP 101 mounted thereon through the processing chambers.

Although, in this embodiment, the outer frame 103 for sealing the vacuum structure, and the spacer 104 for forming the atmospheric pressure resistant structure are previously fixed to the RP 101 before being carried in the front chamber 105, the present invention is not limited to this condition. For example, the spacer 104 may be previously fixed to the outer frame 103 (for example, both ends of the plate spacer 104 are fixed to the outer frame 103 so as to cross the frame 103). This unit comprising the spacer 104 and the outer frame 103 may be placed as a component member in the apparatus separately from the RP 101 and the FP 102, processed in each of the processing steps, and finally fixed as the panel component member at a desired position in the sealing step. Alternatively, the outer frame 103 may be previously fixed on the FP 102.

In order to previously fix the outer frame 103 to the RP 101 or the FP 102, fixing is preferably performed by using a sealing material having a higher melting point than the sealing material 143 which will be described below. For example, when the sealing material 143 comprises a low-melting-point metal such as indium or the like, or an alloy thereof, the outer frame 103 is preferably previously fixed to the RP 101 or the FP 102 by using frit glass.

In FIG. 1A, reference numeral 143 denotes the above-described sealing material which can be previously provided at the FP-side end of the outer frame 103 arranged on the RP 101. However, the arrangement of the sealing material 143 is not limited to this, and the sealing material 143 may be arranged on a portion of the FP 102 to which the outer frame 103 is fixed in contact. When the frame 103 is independently set as a single component member in the apparatus, the sealing material 143 may be arranged at the RP-side end and the FP-side end of the outer frame 103. Alternatively, the sealing material 143 may be arranged on the portions of the RP 101 and the FP 102 to which the outer frame 103 is fixed in contact. Namely, the sealing material 143 may be provided on at least either of the ends of the outer frame 103, and the portions of the RP 101 and the FP 102 to which the outer frame 103 is fixed in contact.

The sealing material 143 used in this embodiment comprises a gallium-indium alloy, a gallium-tin alloy, or an aluminum-gallium alloy, which can be melted and sealed at a relatively low temperature of about 100° C. The melting point of the sealing material can be controlled by changing the mixing ratio between the two elements.

In the apparatus having the above-described construction, the steps for sealing the panel in a vacuum are described below. Although the steps for sealing one panel are described below, the steps for continuously processing and sealing a plurality of panels require different processing times in some cases. In this case, the step requiring a long processing time is divided into a plurality of processing chambers to adjust the processing time to the other processing times, or a plurality of components for processing, for example, the hot plates or the like, are arranged in the same processing chamber for simultaneous processing.

First, the RP 101 to which the outer frame 103 and the spacer 104 are previously fixed, and on which the sealing material 143 is previously provided, and the FP 102 are carried in the front chamber 105. The outer frame 103 and the spacer 104 are fixed to the RP 101 with frit glass, and a Ga—In alloy is used as the sealing material 143. In carrying in, the RP 101 and FP 102 are arranged on a transfer jig so that a space is formed between both plates from the structural viewpoint. The carrying-in and transfer method is not limited to the method using the jig, and the RP 101 and FP 102 may be transferred by a support transfer unit on the apparatus body side without being previously arranged on the jig.

After both substrates are carried in the front chamber 105, the gate valve 112 serving as a carrying-in entrance is closed, and the front chamber 105 is evacuated. At this time, each of the baking chamber 106 and the subsequent processing chambers is set to the degree of vacuum and the temperature profile. Then, during transfer of the RP 101 and the FP 102, the gate valves 113 to 119 between the respective processing chambers are successively opened and closed.

When the pressure in the front chamber 105 reaches the order of $10^{-5}$ Pa, the gate valve 113 is opened, and the RP 101 and the FP 102 are carried out of the front chamber 105 and moved to the baking chamber 106. After this movement is completed, the gate valve 113 is closed.

The RP 101 and the FP 102 moved to the baking chamber 106 without being exposed to the air are heated (baked) by the hot plates 121 and 122 in the baking chamber 106. By baking, impurities such as hydrogen, oxygen, water, etc., which are contained in and adsorbed on the RP 101 and the FP 102, can be exhausted as gases. The baking is performed at the panel member temperature set to 300° C. to 400° C., preferably 350° C. to 380° C., by the hot plates 121 and 122 serving as temperature control means of the baking chamber 106. In this embodiment, the temperature of the hot plates 121 and 122 is set so that the panel member temperature is 380° C. The pressure in the baking chamber is about $10^{-4}$ Pa.

After baking is completed, the RP 101 and the FP 102 are moved to the EB irradiation chamber 107 in which the RP 101 is fixed to the hot plate 123 and moved upward in the EB irradiation chamber 107 by the elevating machine 139. During this time, the RP 101 and the FP 102 are temporarily separated from the hot plates 121 and 122 serving as the heating source of the baking chamber 106. However, the RP 101 and the FP 102 are fixed to the hot plates 123 and 124 of the EB irradiation chamber 107 and heated so as not to produce a rapid temperature drop, thereby causing a slow decrease in temperature. In the substrate temperature region with such a slow decrease in temperature, the EB 126 is emitted from the electron gun 125 to any desired region to perform EB irradiation. The EB irradiation is performed at the panel member temperature which is set to be not more than the set temperature of the panel member in the previous processing chamber, i.e., the baking chamber 106, and preferably higher than the set temperature of the panel member in each of the subsequent processing chambers, by the hot plates 123 and 124 disposed as the temperature control in the EB irradiation chamber 107. The pressure in the EB irradiation chamber 107 is about $10^{-4}$ to $10^{-5}$ Pa. The inside of the chamber for cleaning the surface of the panel member, such as the EB irradiation chamber 107, is preferably set to a vacuum state of $10^{-4}$ Pa or less, and more preferably $10^{-5}$ Pa or less.

The EB irradiation has the effect of cleaning the substrates of the RP 101 and the FP 102 by releasing the adsorbed impurities as gas exhaust. As described above, this irradiation step can use after heat of the baking step, thereby further improving the cleaning effect. The EB irradiation may be performed for both or one of the RP 101 and the FP 102.

Also, the EB irradiation may be performed not only for the RP 101 and the FP 102 but also in any desired region of the EB irradiation chamber. Besides the substrate cleaning effect, the EB irradiation in the chamber space also has the effect of ionizing the gases released by baking and EB irradiation substrate cleaning to further accelerate adsorption of the getter in the subsequent getter flash processing step.

The EB irradiation chamber 107 or the EB irradiation chamber 107 and the pre-gettering chamber 108 (chamber gettering chamber) also have the function as a cooling chamber for decreasing the temperature of the RP 101 and the FP 102 subjected to baking. However, another cooling chamber is also preferably provided between the baking chamber 106 and the EB irradiation chamber 107.

In the cooling chamber, the RP 101 and the FP 102 as the panel member are respectively fixed to the hot plates, and slowly cooled so as not to produce a rapid temperature drop from the panel member temperature at the time of baking. At this time, the temperature region of the panel member is set to be higher than the set temperatures of the panel member in the subsequent processing chambers, and not more than the set temperatures of the panel member in the previous processing chamber, i.e., the baking chamber. The pressure in the cooling chamber is set to $10^{-4}$ Pa or less, and preferably $10^{-5}$ Pa or less.

After the EB irradiation is completed, the elevating machine 139 is moved downward, and the RP 101 is removed from the hot plate 123 and moved to the chamber gettering chamber 108 together with FP 102. The RP 101 and the FP 102 are moved to the chamber gettering chamber 108 without being exposed to the air. The degree of vacuum in the chamber gettering chamber 108 is set to $10^{-5}$ Pa or less. In the chamber gettering chamber 108, an evaporative getter material (for example, barium or the like) contained in the chamber getter flash device 129 is evaporated by resistance heating to produce the chamber getter flash 130, depositing a getter film (not shown) comprising a barium film on the surface of the chamber getter plate 131 other than the panel member arranged on the chamber. The thickness of the chamber getter is generally 5 nm to 500 nm, preferably 10 nm to 200 nm, and more preferably 20 nm to 200 nm. In the chamber gettering step, the getter film deposited on the chamber getter plate 131 adsorbs the gases in the chamber and discharges the gases therefrom to attain a pressure of the order of $10^{-6}$ Pa in the chamber gettering chamber 108. In the chamber gettering chamber 108, the hot plates 127 and 128 serving as the temperature control means for the RP 101 and the FP 102 are set so that the panel member temperature is in a temperature range of not more than the set temperatures of the panel member in the baking chamber 106 and in the previous chamber, i.e., the EB irradiation chamber 107, and higher than the set temperature of the panel member in each of the subsequent processing chambers. In this embodiment, chamber gettering is performed at the temperatures of the hot plates 127 and 128 which are set so that the panel member temperature is 100° C. Although the degree of vacuum in the chamber is temporarily decreased due to evaporation of the getter material by the chamber getter flash 130, the degree of vacuum is increased by evacuation. Chamber gettering is not limited to gettering by using the chamber gettering chamber provided independently as in this embodiment, and chamber gettering may be performed in the panel gettering chamber described below without using the chamber gettering chamber.

Next, the RP 101 and the FP 102 are moved to the panel gettering chamber 109 in which the RP 101 is fixed to the hot plate 132, and moved upward in the panel gettering chamber 109 by the elevating machine 141. The panel gettering chamber 109 is previously evacuated to the order of $10^{-6}$ Pa. In order to attain this degree of vacuum, a general vacuum pump and auxiliary exhaust means such as exhaust by a flash of an evaporative getter material, exhaust by heating activation of a non-evaporative getter material, or the like can be used. The method of evacuating to the order of $10^{-6}$ Pa can also be used for the sealing chamber 110 and the cooling chamber 111.

In the panel gettering chamber 109, an evaporative getter material (for example, barium or the like) contained in the panel gettering flash device 134 is evaporated by resistance heating to produce the panel gettering flash 135, depositing a getter film (not shown) comprising a barium film on the surface of the FP 102. The thickness of the panel getter is generally 50 nm to 500 nm, preferably 10 nm to 200 nm, and more preferably 20 nm to 200 nm. In this chamber, the temperature of the panel member on which the getter film is deposited is set to be not more than the temperature of the panel member during baking, and thus thermal deterioration of the getter film deposited on the panel member can be significantly decreased. Therefore, in the panel gettering chamber 109, the hot plates 132 and 133 serving as the temperature control means for the RP 101 and the FP 102 are arranged for performing panel gettering at the panel member temperature, which is set in a temperature range of not more than the set temperatures of the panel member in the baking chamber and in the previous chamber, i.e., the chamber gettering chamber 108, and higher than the set temperature of the panel member in each of the subsequent processing chambers. In this embodiment, the temperatures of the hot plates 132 and 133 are set so that the panel member temperature is 100° C. to perform panel gettering. The deposited evaporative getter less deteriorates due to gas adsorption because the degree of vacuum of the processing chamber is as high as $10^{-6}$ Pa, and is thus transferred to the next sealing step while sufficiently maintaining the getter evacuation ability.

Although, in FIG. 1A, the getter film is formed to be deposited on the FP 102, the member to which the film is deposited is not limited to this, and the film may be formed on the FP 101. However, the getter material is generally conductive, and thus a large current leakage occurs at the time of drive of the image display panel sealed, or the problem of failing to maintain the resistance to the driving voltage occurs in some cases. For example, when a panel getter flash is produced for the RP 101 shown in FIG. 1A, a conductive getter film is also deposited on the frame 103 and the spacer 104, thereby causing an electrical problem during driving. In this case, the portion to which the getter film must not be deposited is covered with a deposition mask made of a metal thin plate to avoid deposition of the getter film thereon so that the getter film can be deposited only on the necessary portion of the RP 101. Although the getter material is evaporated by the panel getter flash to temporarily decrease the degree of vacuum in the chamber, the degree of vacuum is increased by evacuation.

After the panel gettering step is completed, the elevating machine 141 is moved downward, and the RP 101 is removed from the hot plate 132 and moved to the sealing chamber 110 together with the FP 102.

The RP 101 and the FP 102 are moved to the sealing chamber 110 which is previously evacuated to the order of $10^{-6}$ Pa, and are fixed to the hot plates 136 and 137, respectively. At this time, the sealing material 143 on the frame 103 and the spacer 104, which are fixed to the RP 101, are separated from the FP 102 with a small space therebetween. During this fixing step, the relative position of the RP 101 and the FP 102 in panel sealing is determined. Although the relative position can be determined by using end pins on the basis of the ends, the determination method is not limited to this.

Then, the elevating machine 142 is moved downward, and both the RP and FP substrates are heated with the outer frame 103 fixed to the RP 101 being brought into contact with the FP 102 and pressed thereon. In heating both substrates, the panel member temperature in the sealing chamber 110 is not higher than the set temperature of the panel member in the previous processing chamber, i.e., the panel gettering chamber 109, as shown in the temperature profile of FIG. 1B. The substrates are maintained at the peak temperature at which the sealing material is softened or melted, and then the substrate temperature is decreased to bond and fix the sealing material 143. As a result, the outer frame 103 and the FP 102 are bonded together with the sealing material 143 formed on the outer frame 143, and then the sealing material 143 is fixed by curing. In this processing step, the pressure in the sealing chamber is kept at the order of $10^{-6}$ Pa, and thus the degree of vacuum in the panel sealed in this step is the order of $10^{-6}$ Pa. In this embodiment, the temperatures of the hot plates 132 and 133 are set so that the temperature of the panel member in sealing is 100° C.

In order to permit sealing of the panel member at a relatively low temperature of about 100° C., as in this embodiment, for example, a gallium-indium alloy, a gallium-tin alloy, an aluminum-gallium alloy, or the like, which can be melted at a relatively low temperature, may be used as the sealing material 143.

In this embodiment, a Ga—In alloy (Ga:In=26:74 (weight ratio)) is used as the sealing material 143. Since the Ga—In alloy has a melting point of 80° C., the heating peak temperature is set to 100° C., and the curing fixing temperature is set to 70 to 80° C. for bonding and fixing the sealing material 143.

The sealing step is completed when the temperature decreases to a temperature of not more than the curing fixing temperature of the sealing material, and then the RP 101 is removed from the hot plate 136. After the elevating machine 142 is moved upward, the FP 102 is removed from the hot plate 137, and then a sealed panel 144 comprising the RP 101, the FP 102, the outer frame 103 and the spacer 104 is moved to the cooling chamber 111. The cooling chamber 111 is evacuated to maintain a degree of vacuum of the order of $10^{-6}$ Pa. Then, the sealed panel 144 is removed from the hot plates at the curing fixing temperature of the sealing material 143, and then cooled in the cooling chamber 111. As the cooling means (temperature control means), a water-cooling plate having a temperature control function is used. However, the cooling means is not limited to this, and natural cooling may be performed in the cooling chamber as long as the substrates are not damaged due to a rapid temperature drop of the sealed panel 144.

When the temperature of the sealed panel 144 is decreased to room temperature or a temperature close to room temperature, the cooling chamber 111 is put into the atmospheric pressure by vacuum leakage. Then, the gate valve 119 on the atmospheric side of the apparatus is opened to discharge the sealed panel 144 to the outside of the apparatus.

In the manufacturing apparatus of this embodiment, the gate valve 118 is provided between the sealing chamber 110 and the cooling chamber 111 so that the display panel is discharged from the sealing chamber 110 with the gate valve opened, and then carried in the cooling chamber 111, and the gate valve is then closed. After cooling, the gate valve 119 is opened to discharge the display panel from the cooling chamber 111, and the gate valve 119 is finally closed to finish the whole process. Before the next step is started, the inside of the cooing chamber 111 is preferably set to a vacuum state by a vacuum pumping system (not shown) provided independently.

In this embodiment, besides the evaporative getter material, a non-evaporative getter film or non-evaporative getter material comprising a titanium material may be previously provided on the RP 101 or the FP 102.

As the hot plates 121, 123, 127 and 132, and 136, a machine which can fix the RP 101 with sufficient force without dropping the RP 101, for example, a chuck system using claws for mechanically catching the periphery of a substrate, an electrostatic chuck system, or a vacuum chuck system can be used.

The above-describe embodiment comprises a combination of the processing steps, and modified embodiments can be made according to combinations of the processing steps.

Particularly, in the process from baking to sealing, a first modified embodiment comprises the steps of preparing substrates in a vacuum atmosphere in the front chamber 105, baking in the baking chamber 106, and heat-sealing in the sealing chamber 110, which are connected in line.

A second modified embodiment comprises the steps of preparing substrates in a vacuum atmosphere in the front chamber 105, baking in the baking chamber 106, panel gettering in the panel gettering chamber 109, and heat-sealing in the sealing chamber 110, which are connected in line.

A third modified embodiment comprises the steps of preparing substrates in a vacuum atmosphere in the front chamber 105, baking in the baking chamber 106, surface cleaning by EB irradiation in the EB irradiation chamber 107, panel gettering in the panel gettering chamber 109, and heat-sealing in the sealing chamber 110, which are connected in line.

A fourth modified embodiment comprises the steps of preparing substrates in a vacuum atmosphere in the front chamber 105, baking in the baking chamber 106, EB irradiation in the EB irradiation chamber 107, chamber gettering in the chamber gettering chamber 108, panel gettering in the panel gettering chamber 109, and heat-sealing in the sealing chamber 110, which are connected in line.

A fifth modified embodiment comprises the steps of preparing substrates in a vacuum atmosphere in the front chamber 105, baking in the baking chamber 106, chamber gettering in the chamber gettering chamber 108, panel gettering in the panel gettering chamber 109, and heat-sealing in the sealing chamber 110, which are connected in line.

A sixth modified embodiment comprises the steps of preparing substrates in a vacuum atmosphere in the front chamber 105, baking in the baking chamber 106, cooling the panel member in the cooling chamber, and heat-sealing in the sealing chamber 110, which are connected in line.

A seventh modified embodiment comprises the steps of preparing substrates in a vacuum atmosphere in the front chamber 105, baking in the baking chamber 106, cooling the panel member in the cooling chamber, panel gettering in the panel gettering chamber 109, and heat-sealing in the sealing chamber 110, which are connected in line.

An eighth modified embodiment comprises the steps of preparing substrates in a vacuum atmosphere in the front chamber 105, baking in the baking chamber 106, cooling the panel member in the cooling chamber, surface cleaning by EB irradiation in the EB irradiation chamber 107, panel gettering in the panel gettering chamber 109, and heat-sealing in the sealing chamber 110, which are connected in line.

A ninth modified embodiment comprises the steps of preparing substrates in a vacuum atmosphere in the front chamber 105, baking in the baking chamber 106, cooling the panel member in the cooling chamber, chamber gettering in the chamber gettering chamber 108, panel gettering in the panel gettering chamber 109, and heat-sealing in the sealing chamber 110, which are connected in line.

A tenth modified embodiment comprises the steps of preparing substrates in a vacuum atmosphere in the front chamber 105, baking in the baking chamber 106, cooling the panel member in the cooling chamber, surface cleaning by EB irradiation in the EB irradiation chamber 107, chamber gettering in the chamber gettering chamber 108, panel gettering in the panel gettering chamber 109, and heat-sealing in the sealing chamber 110, which are connected in line.

Modifications of transfer of the component members such as the RP 101, the FP 102, the outer frame 103 and the spacer 104, and introduction into the apparatus include the following.

In a first modification, the RP 101, the FP 102 and the spacer 104 fixed to the outer frame 103 can be introduced as three component members into the apparatus. In this case, the outer frame 103 is sealed at both side ends of the RP 101 and the FP 102 in the apparatus, and thus the sealing material must be formed on the sealing surfaces.

In a second modification, the RP 101 and the FP 102 to which the outer frame 103 or the outer frame 103 and the spacer 104 are bonded can be introduced as two component members into the apparatus. In this case, the outer frame 103 is sealed at the sides of the RP 101 in the apparatus, and thus the sealing material must be previously formed on the sealed surfaces.

For the above modifications of the component members, a modification of the construction of the apparatus comprises processing chambers for each of the component members, which are arranged in a line, so that all component members are gathered in one processing chamber and sealed in the sealing step. Such a modification include the following examples.

An apparatus of a first example comprises three lines of the processing chambers starting from the front chamber 105 and ending at the panel gettering chamber 109, which are provided for the three component members including the RP 101, the FP 102 and the spacer 104 fixed to the outer frame 103 so that the three component members are separately introduced into the respective devices, and a single sealing chamber to which the three panel component members are sealed and cooled in the single sealing chamber.

An apparatus of a second example comprises two lines of the processing chambers starting from the front chamber 105 and ending at the panel gettering chamber 109, which are provided for the two component members including the FP 102 and the RP 101 to which the outer frame 103 is fixed, the FP 102 and the RP 101 to which the spacer 104 and the outer frame 103 are fixed, the RP 101 and the FP 102 to which the outer frame 103 is fixed, the RP 101 and the FP 102 to which the spacer 104 and the outer frame 103 are fixed, so that the two component members are separately introduced into the respective devices, and a single sealing chamber to which the two panel gettering chambers are connected so that the two component members are sealed and cooled in the single sealing chamber. The first and second examples include a case in which gettering may be performed for any one of the three or two component members.

Although, in the above-described embodiment, the degree of vacuum in panel sealing is set to the order of $10^{-6}$ Pa, the degree of vacuum in the present invention is not limited to this value. For example, the degree of vacuum in panel sealing can be set to the order of $10^{-5}$ Pa by using a general vacuum pump. In this case, the chamber gettering chamber 108 and the gettering step for increasing the degree of vacuum in the processing chamber can be omitted. Also, evacuation by an auxiliary getter pump for attaining the order of $10^{-6}$ Pa can be omitted.

The sealed panel 144 subjected to the above processing steps is characterized by a construction in which unlike in a conventional sealed panel, the evaporative getter material used for gettering with a getter flash produced by high-frequency heating or resistance heating as an evaporation source does not remain in the sealed panel regardless of the formation of the getter film of the evaporative material such as Ba, for example, on the FP 102.

The above-described processing steps and apparatus are characterized in that the sealing step and the panel gettering flash step connected thereto are performed in different chambers.

FIG. 2 is a sectional view showing a portion of an image display device formed by the manufacturing apparatus and method of the embodiment of the present invention.

In FIG. 2, the same reference numerals as FIG. 1 denote the same members. The image display device formed by the above-described apparatus and method comprises a vacuum container or reduced-pressure container which is formed by the RP 101, the FP 102 and the outer frame 103. The reduced-pressure container can contain an inert gas such as argon, neon, or the like, or hydrogen gas under reduced pressure.

In the case of a vacuum container, the degree of vacuum can be set to $10^{-5}$ Pa or more, and preferably $10^{-6}$ Pa or more.

In the vacuum container or reduced-pressure container, the spacer is arranged to form an atmospheric pressure resistant structure. The spacer 104 used in the present invention comprises a body 311 made of a no-alkali insulating material such as no-alkali glass, a high-resistance film 309 formed to cover the surface of the body 311 and made of a high-resistance material, and metal (tungsten, copper, silver, gold, molybdenum, or an alloy thereof) films 310 provided at both ends thereof. The spacer 104 is electrically connected to wiring 306 through a conductive adhesive 308. Before carrying in the front chamber 105, the spacer 104 is previously bonded to the RP 101 with the adhesive 308. At the finish of processing in the sealing chamber 110, the other end of the spacer 104 is electrically connected to the FP 102.

The RP 101 comprises a transparent substrate 304 made of glass or the like, an underlying film ($SiO_2$, $SnO_2$, or the like) 305 for preventing entrance of alkali such as sodium, and a plurality of electron beam emitting elements 312 arranged in a XY matrix. The wiring 306 constitutes cathode wiring of cathode-side XY matrix wiring connected to the electron beam emitting elements 312.

In the present invention, a plasma generating element can be used in place of fluorescent material exciting means or the electron means emitting elements used as the image display element member. In this case, the container contains an inert gas such as argon, neon, or the like, or hydrogen gas under reduced pressure.

The FP 102 comprises a transparent substrate 301 made of glass, a fluorescent material layer 302, and an anode metal (aluminum, silver, copper, or the like) film 303 connected to an anode source (not shown).

In the present invention, in use of the plasma generating element, a color filter can be used in place of the fluorescent material used as an image display member.

The outer frame 103 is previously bonded to the RP 101 with a low-melting-point adhesive 307 such as frit glass or the like before carrying in the front chamber 105, and fixed with the low-melting-point sealing material 143 in the sealing step in the sealing chamber 110.

In manufacturing an image display device in which electron beam emitting elements or plasma generating elements are arranged in the XY directions to provide a large capacity of million pixels or more in a large screen having a diagonal size of 30 inches or more, the present invention can significantly shorten the time of the manufacturing process.

Also, the degree of vacuum in the vacuum container constituting an image display device can be increased to $10^{-6}$ Pa or more.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of manufacturing an image display device comprising the steps of:

successively transferring a panel member, which constitutes a panel of an image display device, to a plurality of reduced-pressure processing chambers each comprising temperature control means, and performing a plurality of processings of the panel member under temperature control to form a panel, wherein the plurality of processing chambers include a baking chamber for baking the panel member, and a sealing chamber for sealing the panel member transferred thereto after baking; and performing the processing in each of the plurality of processing chambers so that the temperature of the panel member in each of the processing chambers is set to a temperature of not more than that of the panel member in the previous chamber in the transfer process.

2. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a gettering chamber for gettering the panel member transferred thereto after baking, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

3. A method of manufacturing an image display device according to claim 2, wherein the inside of the gettering chamber is further gettered.

4. A method of manufacturing an image display device according to claim 2, further comprising the step of providing a front chamber adjacent to the gettering chamber, to which the panel member is transferred before transfer to the gettering chamber after baking in the backing chamber, with the insides of the front chamber and the gettering chamber being set to $10^{-4}$ Pa or less.

5. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a surface cleaning chamber for cleaning the surface of the panel member transferred thereto after baking, a gettering chamber for gettering the panel member transferred thereto after surface cleaning, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

6. A method of manufacturing an image display device according to claim 5, wherein the inside of the gettering chamber is further gettered.

7. A method of manufacturing an image display device according to claim 5, further comprising the step of providing a front chamber adjacent to the gettering chamber, to which the panel member is transferred before transfer to the gettering chamber after baking in the baking chamber, with the insides of the front chamber and the gettering chamber being set to $10^{-4}$ Pa or less.

8. A method of manufacturing an image display device according to claim 5, further comprising the step of providing a front chamber adjacent to the gettering chamber, to which the panel member is transferred before transfer to the gettering chamber after surface cleaning in the surface cleaning chamber, with the insides of the front chamber and the gettering chamber being set to $10^{-4}$ Pa or less.

9. A method of manufacturing an image display device according to claim 5, wherein the surface cleaning chamber is adjacent to the gettering chamber, with the insides of the surface cleaning chamber and the gettering chamber being set to $10^{-4}$ Pa or less.

10. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a backing chamber for baking the panel member, a surface cleaning chamber for cleaning the surface of the panel member transferred thereto after baking, a pre-gettering chamber for gettering the inside of the processing chamber to which the panel member is transferred after surface cleaning, a gettering chamber for gettering the panel member transferred thereto after pre-gettering, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

11. A method of manufacturing an image display device according to claim 10, further comprising the step of providing a front chamber adjacent to the pre-gettering chamber, to which the panel member is transferred before transfer to the pre-gettering chamber after surface cleaning in the surface cleaning chamber, with the insides of the front chamber, the pre-gettering chamber and the gettering chamber being set to $10^{-4}$ Pa or less.

12. A method of manufacturing an image display device according to claim 10, wherein the surface cleaning chamber is adjacent to the pre-gettering chamber, with the insides of the surface cleaning chamber, the pre-gettering chamber and the gettering chamber being set to $10^{-4}$ Pa or less.

13. A method of manufacturing an image display device according to claim 5 or 10, wherein surface cleaning for cleaning the surface of the panel member is performed by irradiating the surface with an electron beam.

14. A method of manufacturing an image display device according to claim 5 or 10, wherein surface cleaning for cleaning the surface of the panel member is performed by the irradiating the surface with ions.

15. A method of manufacturing an image display device according to claim 5 or 10, wherein surface cleaning for cleaning the surface of the panel member is performed by irradiating the surface with an ultraviolet ray.

16. A method of manufacturing an image display device according to claim 5 or 10, wherein surface cleaning for cleaning the surface of the panel member is performed by irradiating the surface with plasma.

17. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a pre-gettering chamber for gettering the inside of the processing chamber to which the panel member is transferred after baking, a gettering chamber for gettering the panel member transferred thereto after pre-gettering, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

18. A method of manufacturing an image display device according to claim 17, further comprising the step of providing a front chamber adjacent to the pre-gettering chamber, to which the panel member is transferred before transfer to the pre-gettering chamber after baking in the baking chamber, with the insides of the front chamber, the pre-gettering chamber and the gettering chamber being set to $10^{-4}$ Pa or less.

19. A method of manufacturing an image display device according to any one of claims 1, 2, 5, 10 and 17, wherein the sealing temperature of the panel member in the sealing chamber is set to be not more than the baking temperature of the panel member in the baking chamber.

20. A method of manufacturing an image display device according to any one of claims 2, 5, 10 and 17, wherein the gettering temperature of the panel member in the gettering chamber is set to be not more than the baking temperature of the panel member in the baking chamber.

21. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, and a sealing chamber for sealing the panel member transferred thereto after cooling; and performing the processing in each of the plurality of processing chambers so that the temperature of the panel member in each of the processing chambers is set to a temperature of not more than that of the panel member in the previous chamber in the transfer process.

22. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a gettering chamber for gettering the panel member transferred thereto after cooling, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

23. A method of manufacturing an image display device according to claim 22, wherein the inside of the gettering chamber is further gettered.

24. A method of manufacturing an image display device according to claim 22 or 23, further comprising the step of providing a front chamber adjacent to the gettering chamber, to which the panel member is transferred before transfer to the gettering chamber after cooling in the cooling chamber, with the insides of the front chamber and the gettering chamber being set to $10^{-4}$ Pa or less.

25. A method of manufacturing an image display device according to claim 22 or 23, wherein the cooling chamber is adjacent to the gettering chamber, with the insides of the cooling chamber and the gettering chamber being set to $10^{-4}$ Pa or less.

26. A method of manufacturing an image display device according to claim 25, wherein the inside of the cooling chamber is gettered.

27. A method of manufacturing an image display device according to claim 22, wherein surface cleaning of the panel member is performed in the cooling chamber.

28. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a surface cleaning chamber for cleaning the surface of the panel member transferred thereto after cooling, a gettering chamber for gettering the panel member transferred thereto after surface cleaning, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

29. A method of manufacturing an image display device according to claim 28, further comprising the step of providing a front chamber adjacent to the gettering chamber, to which the panel member is transferred before transfer to the gettering chamber after surface cleaning in the surface cleaning chamber, with the insides of the front chamber and the gettering chamber being set to $10^{-4}$ Pa or less.

30. A method of manufacturing an image display device according to claim 28, wherein the surface cleaning chamber is adjacent to the gettering chamber, with the insides of the surface cleaning chamber and the gettering chamber being set to $10^{-4}$ Pa or less.

31. A method of manufacturing an image display device according to claim 28, wherein the inside of the gettering chamber is further gettered.

32. A method of manufacturing an image display device comprising the steps of:

successively transferring a panel member, which constitutes a panel of the image display device, to a plurality of reduced-pressure processing chambers each comprising temperature control means, and performing a plurality of processings of the panel member under temperature control to form a panel, wherein the plurality of processing chambers include a baking chamber for baking the panel member, a cooling chamber for cooling the panel member transferred thereto after baking, a surface cleaning chamber for cleaning the surface of the panel member transferred thereto after cooling, a pre-gettering chamber for pre-gettering the chamber to which the panel transfer is transferred after surface cleaning, a gettering chamber for gettering the panel member transferred thereto after pre-gettering, and a sealing chamber for sealing the panel member transferred thereto after gettering and performing the processing in each of the plurality of processing chambers so that the temperature of the panel member in each of the processing chambers is set to a temperature of not more than that of the panel member in the previous chamber in the transfer process.

33. A method of manufacturing an image display device according to claim 32, wherein the plurality of the processing chambers include a front chamber adjacent to the pre-gettering chamber, to which the panel member is transferred before transfer to the pre-gettering chamber after surface cleaning in the surface cleaning chamber, the insides of the front chamber, the pre-gettering chamber, and the gettering chamber being set to $10^{-4}$ Pa or less.

34. A method of manufacturing an image display device according to claim 32, wherein the surface cleaning chamber is preferably adjacent to the pre-gettering chamber, with the insides of the surface cleaning chamber, the pre-gettering chamber and the gettering chamber being set to $10^{-4}$ Pa or less.

35. A method of manufacturing an image display device according to claim 28 or 32, wherein surface cleaning for cleaning the surface of the panel member is performed by irradiating the surface with an electron beam.

36. A method of manufacturing an image display device according to claim 28 or 32, wherein surface cleaning for cleaning the surface of the panel member is performed by irradiating the surface with ions.

37. A method of manufacturing an image display device according to claim 28 or 32, wherein surface cleaning for cleaning the surface of the panel member is performed by irradiating the surface with an ultraviolet rays.

38. A method of manufacturing an image display device according to claim 28 or 32, wherein surface cleaning for cleaning the surface of the panel member is performed by irradiating the surface with plasma.

39. A method of manufacturing an image display device comprising the steps of:

successively transferring a panel member, which constitutes a panel of the image display device, to a plurality of reduced-pressure processing chambers each comprising temperature control means, and-performing a plurality of processings of the panel member under temperature control to form a panel, wherein the plurality of processing chambers include a baking chamber for baking the panel member, a cooling chamber for cooling the panel member transferred thereto after baking, a pre-gettering chamber for pre-gettering the processing chamber to which the panel transfer is transferred after cooling, a gettering chamber for gettering the panel member transferred thereto after pre-gettering, and a sealing chamber for sealing the panel member transferred thereto after gettering; and performing the processing in each of the plurality of processing chambers so that the temperature of the panel member in each of the processing chambers is set to a temperature of not more than that of the panel member in the previous chamber in the transfer process.

40. A method of manufacturing an image display device according to claim 39, further comprising the step of providing a front chamber adjacent to the pre-gettering chamber, to which the panel member is transferred before transfer to the pre-gettering chamber after cooling in the cooling chamber, with the insides of the front chamber, the pre-gettering chamber, and the gettering chamber being set to $10^{-4}$ Pa or less.

41. A method of manufacturing an image display device according to claim 39, wherein the cooling chamber is adjacent to the pre-gettering chamber, with the insides of the cooling chamber, the pre-gettering chamber and the gettering chamber being set to $10^{-4}$ Pa or less.

42. An apparatus for manufacturing an image display device comprising:

a plurality of processing chambers each comprising temperature control means, to which a panel member constituting a panel of an image display device is transferred for performing a plurality of processings of the panel member under temperature control to manufacture an image display device, wherein the temperature control means in each of the plurality of processing chambers sets the temperature of the panel member in each of said processing chambers to a temperature of not more than that of the panel member in the previous chamber in the transfer process.

43. An apparatus for manufacturing an image display device according to claim 42, wherein said plurality of processing chambers include a baking chamber for baking the panel member, and a sealing chamber for sealing the panel member transferred thereto after baking in said baking camber.

44. An apparatus for manufacturing an image display device according to claim 42, wherein said plurality of processing chambers include a gettering chamber for forming a getter film on the panel member, and a sealing chamber for sealing the panel member after gettering in said gettering chamber.

45. An apparatus for manufacturing an image display device according to claim 42, wherein said plurality of processing chambers include a surface cleaning chamber for cleaning the surface of the panel member, a getting chamber for forming a getter film on the panel member transferred thereto after surface cleaning in said surface cleaning chamber, and a sealing chamber for sealing the panel member transferred thereto after gettering in said gettering chamber.

46. An apparatus for manufacturing an image display device according to claim 42, wherein said plurality of processing chambers include a surface cleaning chamber for cleaning the surface of the panel member, a pre-gettering chamber for pre-gettering the panel member transferred thereto after surface cleaning in said surface cleaning chamber, a gettering chamber for forming a getter film on the panel member transferred thereto after pre-gettering in said pre-gettering chamber, and a sealing chamber for sealing the panel member transferred thereto after gettering in said gettering chamber.

47. An apparatus for manufacturing an image display device according to claim 42, further comprising heat shield members provided between said respective processing chambers.

48. An apparatus for manufacturing an image display device according to claim 47, wherein said heat shield members comprise a reflecting metal.

* * * * *

UNITED STATES PATENT AND TRADEMARK OFFICE
CERTIFICATE OF CORRECTION

PATENT NO. : 6,702,636 B2
DATED : March 9, 2004
INVENTOR(S) : Kohei Nakata et al.

It is certified that error appears in the above-identified patent and that said Letters Patent is hereby corrected as shown below:

Drawings,
Sheet 1, Figure 1C, "ATMOSLIERIC" should read -- ATMOSPHERIC --.

Column 22,
Line 55, "backing" should read -- baking --.

Column 23,
Line 43, "backing" should read -- baking --.

Column 24,
Line 10, "the" (first occurrence) should be deleted.

Column 27,
Line 18, "and-performing" should read -- and performing --.

Column 28,
Line 17, "camber" should read -- chamber --.
Line 27, "getting" should read -- gettering --.

Signed and Sealed this

Fourteenth Day of September, 2004

JON W. DUDAS
*Director of the United States Patent and Trademark Office*